US011537618B2

(12) United States Patent
Gupta et al.

(10) Patent No.: US 11,537,618 B2
(45) Date of Patent: Dec. 27, 2022

(54) COMPLIANT ENTITY CONFLATION AND ACCESS

(71) Applicant: Microsoft Technology Licensing, LLC, Redmond, WA (US)

(72) Inventors: Ankit Gupta, Mountain View, CA (US); Juan G. Grande, Mountain View, CA (US); Aarthi Jayaram, Sunnyvale, CA (US); Diego Andres Buthay, Saratoga, CA (US); Raghu Ram Hiremagalur Venkatesh, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

(21) Appl. No.: 16/822,262

(22) Filed: Mar. 18, 2020

(65) Prior Publication Data
US 2021/0294797 A1 Sep. 23, 2021

(51) Int. Cl.
*G06F 21/00* (2013.01)
*G06F 16/2455* (2019.01)
*G06F 16/2453* (2019.01)
*G06N 20/00* (2019.01)
*G06F 21/60* (2013.01)

(52) U.S. Cl.
CPC .... *G06F 16/2456* (2019.01); *G06F 16/24537* (2019.01); *G06F 21/602* (2013.01); *G06N 20/00* (2019.01)

(58) Field of Classification Search
CPC ........... G06F 16/2456; G06F 16/24537; G06F 21/602; G06F 16/24544; G06F 16/2455; G06F 16/6254; G06N 20/00
See application file for complete search history.

(56) References Cited

U.S. PATENT DOCUMENTS

| 2015/0128284 A1 | 5/2015 | Lafever et al. |
| 2018/0096018 A1* | 4/2018 | Cazin .................... G06F 16/273 |
| 2020/0327252 A1* | 10/2020 | Mcfall .................... G06F 21/78 |

FOREIGN PATENT DOCUMENTS

| EP | 3096258 A1 | 11/2016 |
| WO | 2017187207 A1 | 11/2017 |

OTHER PUBLICATIONS

"International Search Report and Written Opinion issued in PCT Application No. PCT/US21/021799", dated Jun. 10, 2021, 14 Pages.

* cited by examiner

*Primary Examiner* — Yogesh Paliwal
(74) *Attorney, Agent, or Firm* — NDWE, LLP

(57) ABSTRACT

The disclosed embodiments provide a system for managing data conflation. During operation, the system generates matches between a first set of entities in a first dataset from a first data provider and a second set of entities in a second dataset from a second data provider based on comparisons of fields in the first and second datasets. Next, the system modifies a join query for joining the first and second datasets to include operators representing compliance rules for the first or second datasets. The system executes the modified join query to produce a joined dataset that adheres to the compliance rules and stores data related to the joined dataset within a platform that logically isolates the data from additional datasets. During processing of queries of the data, the system modifies the queries to include additional operators that enforce access control policies for the data.

21 Claims, 5 Drawing Sheets

COMPLIANT ENTITY CONFLATION AND ACCESS

BACKGROUND

Field

The disclosed embodiments relate to techniques for conflating data. More specifically, the disclosed embodiments relate to a platform for managing compliant entity conflation and access.

Related Art

Organizations with large numbers of users often store and/or manage large volumes of data for the users. For example, an online network with hundreds of millions of members can maintain on the order of petabytes (PB) of data related to the members' profiles and/or activity.

At times, updates to user data and/or other types of data are required for compliance with regulations and/or policies. For example, search data, location data, personally identifiable information (PR), and/or other fields in a dataset require obfuscation and/or transformation to comply with privacy and/or opt-out preferences for the corresponding users. When datasets are shared and/or combined across organizations, data in the datasets may additionally be subject to multiple sets of privacy and/or compliance rules, which complicates securing of, access to, or use of the data by representatives of the organizations.

BRIEF DESCRIPTION OF THE FIGURES

In the figures, like reference numerals refer to the same figure elements.

DETAILED DESCRIPTION

Figure 1:
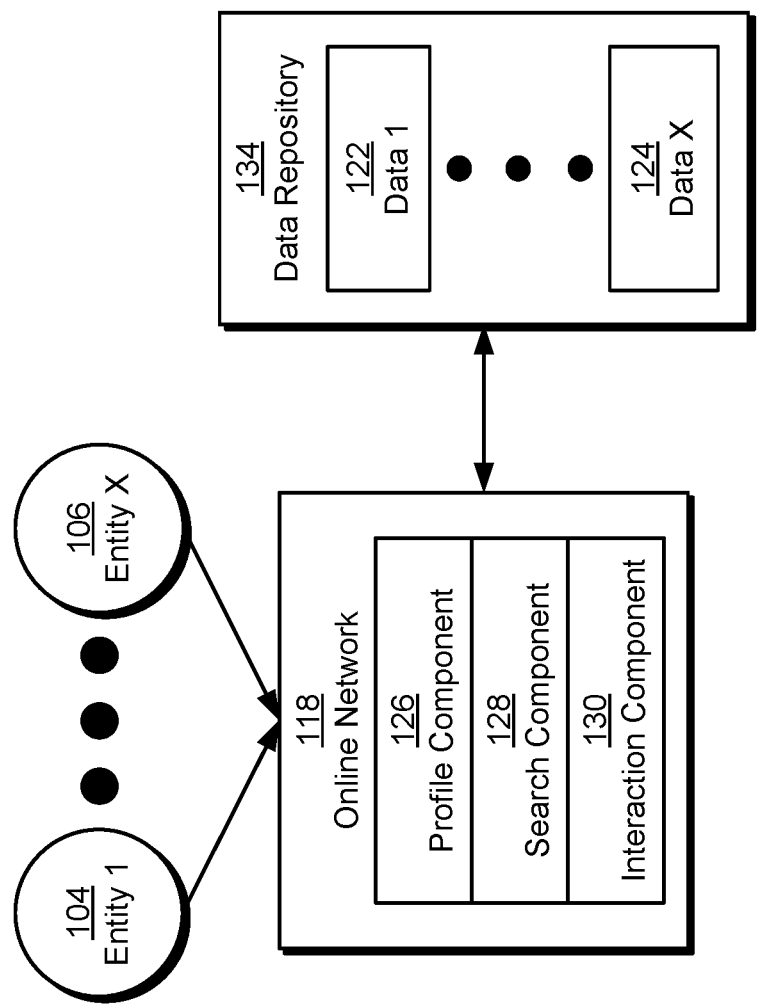
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for managing conflation of and access to data associated with multiple data providers. For example, the data includes datasets from two or more organizations or data providers. The data is joined, merged, or otherwise conflated to produce one or more new datasets, which are stored in distributed environments that allow the datasets to be queried, analyzed, and/or served to users authorized by the data providers.

More specifically, the disclosed embodiments provide a platform for enforcing compliance, privacy, security, and other data access policies related to multiple data providers during merging of the datasets from the data providers and/or subsequent access to the merged data. These data access policies include, but are not limited to, a compliance policy for each organization and/or dataset within the organization; privacy policies or rules for individual entities represented within the dataset (e.g., users, accounts, etc.); and/or different levels of access to the datasets and/or merged data.

To conflate input datasets from two or more data providers, the platform matches entities in the datasets based on similarity and/or overlap in fields related to the entities from the datasets. For example, the platform matches records for registered users of an online network from a first dataset with records for employees of a company from a second dataset based on bindings between the users' accounts with the online network and the corresponding employee accounts with the company, email addresses that are shared by records across the two datasets, and/or other attributes (e.g., first name, last name, company, title, location, etc.) that are shared by records across the two datasets.

Next, the platform executes a join query that joins the input datasets by the matched entities in a way that adheres to compliance rules for some or all datasets and/or data providers. For example, the platform adds operators representing compliance rules for one or more entities in the datasets to the join query. The operators may be used to remove, obfuscate, encrypt, and/or otherwise transform certain fields related to the entities so that the joined dataset conforms to laws, regulations, and/or policies that apply to the datasets. The platform then uses the join query to produce a joined dataset from two or more input datasets, with each record in the joined dataset representing a match across entities in the input datasets. Each record in the joined dataset also includes one or more fields from each of the input datasets.

The platform then stores and/or processes queries of the joined data and/or additional datasets derived from the joined data in a way that enforces an access control policy for the data and/or isolates the data from other data providers or entities. For example, the access control policy specifies different levels of access to the joined and/or derived data for various roles (e.g., users, organizations, etc.) and/or rules. The access control policy may be created based on input from administrators of the data providers. Such input may be used to update the access control policy and dynamically grant and/or revoke access to the joined and/or derived data according to the roles and/or rules.

To enforce the access control policy for a given dataset the platform verifies that an entity requesting access to the dataset (e.g., a user with an account or identity with the platform) is granted access to data in the access control policy. If compliance rules that limit the entity's access to the dataset exist, the platform modifies queries of the dataset by the entity to include additional operators that perform filtering or other transformation of the data based on the compliance rules. The platform also processes the query in a way that prevents the queries from combining the dataset with datasets from other data providers. Such exclusion may be performed by, for example, encrypting and decrypting each dataset with a different key, modifying the queries to include "group by" or other filtering clauses that isolate the datasets from one another in results of the queries, and/or storing the datasets in different instances of the platform and/or on different sets of physical resources.

By conflating data from multiple data providers in a way that adheres to compliance, privacy, and/or other data access policies for the data providers, the disclosed embodiments allow for separate creation and enforcement of the policies. Administrators of the data providers are thus able to grant, revoke, and/or modify access to the data in an on-demand basis, and data from the data providers is conflated in a way that enforces the policies on a per-record, per-field, and/or per-query basis. The platform is additionally able to manage creation of and access to multiple conflated datasets by applying different policies to different combinations of datasets and/or enforcing logical or physical isolation of the datasets from one another (e.g., through encryption and decryption of the datasets with different keys and/or modification of queries of the datasets).

In turn, the platform reduces overhead associated with storing, processing, and/or querying sensitive data and/or data associated with multiple data access policies. For example, the platform automatically creates storage accounts, security identities, roles, and/or other components for storing and accessing a conflated dataset based on compliance and/or access control policies of the corresponding data providers. The platform also modifies queries for creating and/or accessing the conflated data in a way that enforces the policies. In contrast, conventional techniques require manual configuration and/or review of roles, accounts, queries, platforms, and/or other components involved in isolating or securing data. These techniques are subject to mistakes and/or errors in the configuration and/or review, which reduces the security and/or isolation of the data. Moreover, steps for remedying the mistakes and/or errors can involve additional processing to create, delete, and/or reconfigure the components, which increases resource consumption and/or overhead on computer systems on which the components execute. Because the disclosed embodiments reduce security issues, privacy issues, errors, overhead, and/or processing over conventional data processing or conflation techniques, the disclosed embodiments provide technological and performance improvements in computer systems, applications, user experiences, tools, platforms, and/or technologies related to securing, querying, modifying, conflating, and/or accessing data in distributed environments.

Compliant Entity Conflation and Access

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile component 126 that allows the entities to create and edit profiles containing information related to the entities' professional and/or industry backgrounds, experiences, summaries, job titles, projects, skills, and so on. Profile component 126 also allows the entities to view the profiles of other entities in online network 118.

Profile component 126 also, or instead, includes mechanisms for assisting the entities with profile completion. For example, profile component 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search component 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction component 130 that allows the entities to interact with one another on online network 118. For example, interaction component 130 may allow a user, company, school, or other entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or features. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is logged and stored in a database, data warehouse, cloud storage, and/or other data-storage mechanism providing data repository 134.

More specifically, data related to online network 118 and/or data stored in data repository 134 includes (but is not limited to) user data, company data, and/or job data. The user data include attributes from the users' profiles with online network 118, such as the users' titles, summaries, skills, work experience, education, seniorities, industries, locations, and/or profile completeness. The user data also, or instead, includes each user's connections or contacts in online network 118, the user's tenure on online network 118

(e.g., a number of days, weeks, months, or years since the user joined online network 118), a set of groups to which the user belongs, awards or honors earned by the user, licenses or certifications attained by the user, and/or patents or publications associated with the user. The user data also, or instead, includes attributes that are specific to one or more components of online network 118, such as a classification of the user as a job seeker or non-job-seeker.

In some embodiments, the user data characterizes the activity of the users with online network 118. For example, the user data may include an activity level of each user, which may be binary (e.g., dormant or active) or calculated by aggregating different types of activities (e.g., user sessions over a month, page views per session, searches, clicks, etc.) into an overall activity count and/or a bucketized activity score. The user data also, or instead, logs impressions, clicks, likes, dislikes, shares, hides, comments, posts, updates, conversions, and/or other user interaction with content in the platform, as well as other types of activity, including connections, messages, job applications, job searches, recruiter searches for candidates, interaction between candidates and recruiters, and/or interaction with groups or events.

In some embodiments, the user data further includes social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. The user data also, or instead, includes schedules, calendars, and/or upcoming availabilities of the users, which may be used to schedule meetings, interviews, and/or events for the users.

The company data include attributes and/or metrics associated with companies. For example, company data for a company may include demographic attributes such as a location, an industry, an age, and/or a size (e.g., small business, medium/enterprise, global/large, number of employees, etc.) of the company. The company data may further include a measure of dispersion in the company, such as a number of unique regions (e.g., metropolitan areas, counties, cities, states, countries, etc.) to which the employees and/or members of online network 118 from the company belong.

A portion of company data may relate to behavior with a number of products offered by or through online network 118. For example, the company data may include recruitment-based data, such as the number of recruiters, a potential spending of the company with a recruiting solution in online network 118, a number of hires over a recent period (e.g., the last 12 months), and/or the same number of hires divided by the total number of employees and/or members of online network 118 in the company.

The company data may also indicate a company's level of engagement with and/or presence on online network 118. For example, the company data includes a number of employees who are members of online network 118, a number of employees at a certain level of seniority (e.g., entry level, mid-level, manager level, senior level, etc.) who are members of online network 118, and/or a number of employees with certain roles (e.g., engineer, manager, sales, marketing, recruiting, executive, etc.) who are members of online network 118. The company data may also include the number of online network 118 members at the company with connections to employees of the online network 118, the number of connections among employees in the company, and/or the number of followers of the company in online network 118. The company data may further log visits to online network 118 from employees of the company, such as the number of employees at the company who have visited online network 118 over a recent period (e.g., the last 30 days) and/or the same number of visitors divided by the total number of online network 118 members at the company.

At least some company data may be derived from user data. For example, the company data may include measures of aggregated user activity for specific activity types (e.g., profile views, page views, jobs, searches, purchases, endorsements, messaging, content views, invitations, connections, recommendations, advertisements, etc.), user segments (e.g., groups of users that share one or more common attributes, such as members in the same location and/or industry), and companies. In turn, the company data may be used to glean company-level insights or trends from user-level data, perform statistical inference at the company and/or user segment level, and/or guide decisions related to activities that can be conducted by companies within online network 118.

The job data includes attributes of jobs posted or described within online network 118. For example, the job data may include declared or inferred attributes of a job, such as the job's title, company, required or desired skills, responsibilities, qualifications, role, location, industry, seniority, salary range, benefits, and/or member segment. At least some job data may also be derived from user data and/or company data. For example, the job data may provide a context of each user's impression of a job listing or job description. The context may include a time and location (e.g., geographic location, application, website, web page, etc.) at which the job listing or description is viewed by the member. In another example, the job data includes count of views, clicks, applications, and/or other user actions related to a given job.

Those skilled in the art will appreciate that data repository 134 may store other types of data related to online network 118. For example, data repository 134 includes articles, posts, images, videos, slide decks, documents, advertisements, and/or other content that is created and/or shared within online network 118. Data repository 134 also, or instead, includes metadata related to the content, such as authors or creators of the content, the time at which the content was created or shared, statistics associated with the content (e.g., counts of views, likes, shares, or other types of interaction with the content), and/or users that have interacted with the content.

In one or more embodiments, data in data repository 134 is standardized before the data is used by components of the system. For example, skills in user data and/or jobs data are organized into a hierarchical taxonomy that is stored in data repository 134 and/or another repository. The taxonomy models relationships between skills (e.g., "Java programming" is related to or a subset of "software engineering") and/or standardize identical or highly related skills (e.g., "Java programming," "Java development," "Android development," and "Java programming language" are standardized to "Java").

In another example, locations in data repository 134 include cities, metropolitan areas, states, countries, continents, and/or other standardized geographical regions. Like standardized skills, the locations can be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, user activity data 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, standardized attributes in data repository 134 are represented by unique identifiers (IDs) in the corresponding taxonomies. For example, each standardized skill is represented by a numeric skill ID in data repository 134, each standardized title is represented by a numeric title ID in data repository 134, each standardized location is represented by a numeric location ID in data repository 134, and/or each standardized company name (e.g., for companies that exceed a certain size and/or level of exposure in the online system) is represented by a numeric company ID in data repository 134.

In some embodiments, data in data repository 134 is combined into a graph. Nodes in the graph represent entities (e.g., users, schools, companies, locations, jobs, content etc.) in the platform. Edges between the nodes in the graph represent relationships between the corresponding entities, such as connections between pairs of users, education of users at schools, employment of users at companies, following of a user or company by another user, business relationships and/or partnerships between organizations, and/or residence of users at locations. The edges also, or instead, indicate actions taken by the entities, such as creating or sharing articles or posts, sending messages, sending or accepting connection requests, endorsing or recommending one another, writing reviews, applying to opportunities, joining groups, and/or following other entities.

Data in data repository 134 may then used to generate recommendations, search results, and/or other insights related to users, companies, schools, groups, content, jobs, and/or other entities within online network 118. For example, one or more components of online network 118 may track searches, clicks, views, text input, conversions, and/or other feedback during the entities' interaction with profile component 126, search component 128, interaction component 130, and/or other components of online network 118. The feedback may be stored in data repository 134 and used as training data for one or more machine learning models, and the output of the machine learning model(s) may be used to display and/or otherwise recommend jobs, advertisements, posts, articles, connections, products, companies, groups, and/or other types of content, entities, or actions to members of online network 118.

Data in data repository 134 may additionally be conflated with datasets from other data providers to generate additional insights and/or support additional functionality related to online network 118 and/or the other data providers. In some embodiments, conflation of data includes joining, merging, or otherwise combining fields or records from two or more datasets. For example, data from data repository 134 that is related to career path transitions (e.g., sequences of job titles, seniorities, industries, etc. in users' career histories) of users of online network 118 may be joined with salary or benefit information from employers to provide a more comprehensive set of data or trends related to the users' career trajectories. In another example, skills that are listed in user profiles with online network 118 and/or endorsed by other users are joined with employee records at a company. The joined data may then be queried and/or analyzed to identify employees in the company that have certain skills, shortages or surpluses of various skills within the company, top skills possessed by individual teams in the company, and/or other types of trends or patterns related to skills of the company's employees.

Those skilled in the art will appreciate that datasets from data repository 134, online network 118, and/or other data providers may be subject to various compliance, privacy, and/or data-access policies that apply at different granularities and/or to different sets of records or fields in the datasets. For example, data in data repository 134 and/or data from external data providers may be subject to privacy regulations at a local, national, or regional level. Similarly, different types of data may be associated with different levels of protection or security (e.g., financial data or health records may have the highest level of protection, business records or deidentified health information may have a moderate level of protection, and publicly available data may have a low level of protection). Each data provider may also have a separate privacy policy related to gathering, use, or sharing of data. Individual users are additionally able to specify or customize privacy settings that limit the collection and/or sharing of the users' data and/or individual fields in the users' data.

Thus, when a conflated dataset is created by joining data from online network 118 and/or other data providers, the conflated dataset may be required to adhere to data-access rules and/or regulations from all of the data providers and/or for all types of data in the conflated dataset. As a result, significant complexity and/or overhead may be incurred in ensuring that the conflated dataset is created, stored, and accessed in a way that conforms to these rules and regulations.

Figure 2:
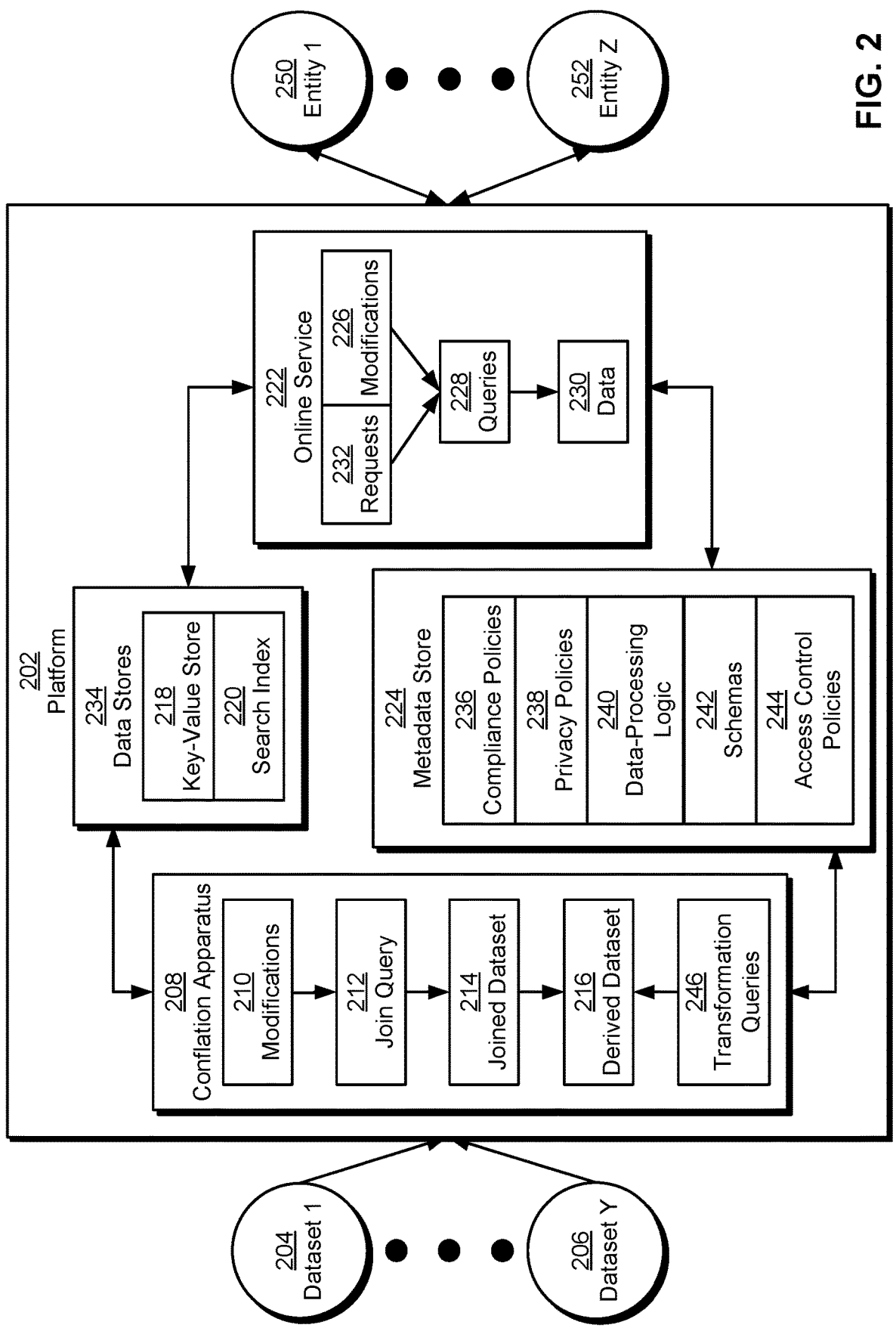
FIG. 2 shows a system for managing data conflation in accordance with the disclosed embodiments.

In one or more embodiments, a platform that is physically and/or logically isolated from one or more of the data providers is used to create, store, and manage access to conflated datasets that contain data from the data providers. As shown in FIG. 2, such a platform 202 includes a conflation apparatus 208, a metadata store 224, a number of data stores 234, and an online service 222. Each of these components is described in further detail below.

Conflation apparatus 208 combines two or more input datasets (e.g., dataset 1 204, dataset y 206) into a joined dataset 214. In some embodiments, each input dataset is provided by a different data provider, and joined dataset 214 includes some or all fields from each of the input datasets.

Conflation apparatus 208 additionally includes functionality to generate a derived dataset 216 from data in joined dataset 214. More specifically, one or more fields in derived dataset 216 are generated as transformations of one or more fields in joined dataset 214.

For example, conflation apparatus 208 joins skills listed in user profiles of an online system (e.g., online network 118 of FIG. 1) with employee records from a company to produce derived dataset 216. Each record in derived dataset 216 includes an employee identifier (ID) of a user that has both an employee record with the company and a profile in the online system. The employee ID is mapped to a list of skills from the user's profile with the online system and the user's team within the company. Conflation apparatus 208 then aggregates counts of skills by teams in joined dataset 214 to create derived dataset 216. Each record in derived dataset 216 includes a name of a team in the company and a list of the 5 most frequently occurring skills among employees in the team. Consequently, joined dataset 214 and/or derived dataset 216 allow disparate input datasets from different data providers to be combined and/or transformed in a way that improves understanding of data in the datasets, reveals insights associated with the data, and/or increases the usability or applicability of the data to various types of applications, platforms, and/or distributed systems.

In some embodiments, conflation apparatus 208 produces joined dataset 214 and/or derived dataset 216 according to metadata in metadata store 224. Metadata store 224 includes a database, distributed filesystem, cloud storage system, and/or another type of repository for metadata that is used to create, store, and/or manage access to joined dataset 214 and/or derived dataset 216. This metadata includes compliance policies 236 for some or all data providers of the input datasets. For example, compliance policies 236 include federal, state, local, and/or other governmental regulations related to privacy and/or data access.

Metadata in metadata store 224 also, or instead, includes privacy policies 238 of the data providers and/or individual users (or other entities) represented within the input datasets. For example, privacy policies 238 include corporate standards or rules related to gathering, storing, using, and/or sharing data by a given data provider. Privacy policies 238 also, or instead, include privacy settings for individual users and/or other entities (e.g., companies, schools, governmental agencies, etc.) that share data with a data provider.

In one or more embodiments, compliance policies 236 and/or privacy policies 238 in metadata store 224 are specified using a set of configurable rules. For example, compliance policies 236 and privacy policies 238 are stored in one or more configuration files that are created by data providers of the input datasets and/or entities that share data with the data providers. Each configuration file includes a set of rules that are defined using a domain-specific language (DSL) that can be parsed by platform 202, with each rule specifying a condition against which data in one or more input datasets is evaluated (e.g., a value or range of values for a field in an input dataset). When the condition evaluates to a given value (e.g., true) for one or more rows, columns, and/or another portion of the input dataset(s), a corresponding action (e.g., filtering of the portion from joined dataset 214 and/or derived dataset 216) is performed.

Metadata store 224 additionally includes data-processing logic 240 and schemas 242 for producing joined dataset 214 and/or derived dataset 216. In some embodiments, schemas 242 describe the structure of data in the input datasets, joined dataset 214, and/or derived dataset 216. For example, schemas 242 include names and/or data types associated with rows and columns in each of the datasets.

Data-processing logic 240 includes a join query 212 that is executed by conflation apparatus 208 to generate joined dataset 214 from the input datasets. For example, join query 212 may be specified using Structured Query Language (SQL), GraphQL, SPARQL (SPARQL Protocol and RDF Query Language), and/or another type of query language. Join query 212 may include an inner join, left outer join, and/or another type of join operation that combines one or more fields from a first input dataset with one or more fields from a second input dataset. Join query 212 optionally specifies a join predicate (e.g., after an "on" or "where" keyword in a SQL query) that specifies how fields from the input datasets are joined into records in joined dataset 214.

Those skilled in the art will appreciate that entities such as users, companies, schools, jobs, and/or skills may be represented using different unique IDs and/or keys in each input dataset. For example, a user may be represented using a unique user ID in a first dataset for an online system and a different unique employee ID in a second dataset for a company at which the user is employed. As a result, a user record for the user in the first dataset cannot be joined with an employee record for the user in the second dataset by matching the user ID for the user in the first dataset to the employee ID for the user in the second dataset.

In one or more embodiments, conflation apparatus 208 creates joined dataset 214 by generating matches between (or among) entities in the input datasets based on comparisons of potentially non-unique fields associated with the entities in the input datasets. These comparisons may be associated with different levels of confidence in the corresponding matches. Continuing with the above example, conflation apparatus 208 generates a first set of "highest-confidence" matches between user records in the first dataset and employee records in the second dataset based on a table of bindings between user accounts in the online system and employee accounts with a portal used to manage employees of the company. Each record in the table of bindings is generated after a user represented by the account binds his/her account with the online system with a corresponding account with the portal. To bind the two accounts, the user may provide authentication credentials for his/her account with the online system (or the portal) while the user is logged into the portal (or the online system). In response to the provided authentication credentials, the online system (or portal) may perform an "integration" that generates an association between the two accounts and allows functionality of one account to be accessed via the other account. In turn, a record of this association between the accounts is stored as a binding between the accounts in the table.

Continuing with the above example, conflation apparatus 208 also, or instead, generates a second set of "high-confidence" matches between the user records and the employee records based on work email addresses shared by the user records and employee records. Conflation apparatus 208 also, or instead, generates a third set of "mid-confidence" matches between the user records and employee records when first names, last names, titles, locations, positions, and/or companies in the user records and employee records are identical.

Continuing with the above example, conflation apparatus 208 also, or instead, applies a machine learning model to features that include fields in the user and employee records (e.g., first and last names, titles, positions, locations, companies, etc.) and/or comparisons of fields in the user records with corresponding fields in the employee records (e.g., a Boolean value indicating if a field in a user record exactly matches a corresponding field in an employee record, an edit distance between the two fields, etc.). The machine learning model may include (but is not limited to) a regression model, neural network, tree-based model, and/or deep learning model. In response to the inputted features, the machine learning model outputs, for a given pair of records that include a user record from the first dataset and an employee record from the second dataset, a match score representing the level of confidence that the user record and employee record represent the same user. When the match score exceeds a threshold, conflation apparatus 208 establishes a match between the user record and employee record.

In some embodiments, conflation apparatus 208 joins records in the input datasets based on a configurable requirement or threshold for the level of confidence in matches between entities represented by the records. For example, conflation apparatus 208 may obtain a minimum level of confidence in a match between entities in the input datasets from data-processing logic 240 and/or other metadata in metadata store 224. The minimum level of confidence may be specified by administrators of one or more data providers of the input datasets based on the types of data to be joined in the input datasets and/or subsequent use of the data. A higher minimum level of confidence may be specified for joins of sensitive and/or personal data, such as human resources records for individual employees in a company. Conversely, a lower minimum level of confidence may be specified for joins that involve company-level, industry-level, or other data that does not include personally identifiable information (PII). After pairs or groups of matched entities that meet the minimum level of confidence are identified, conflation apparatus 208 executes join query 212 to join records representing the matched entities. Consequently, matches across entities in the input datasets identified by conflation apparatus 208 may serve as an implicit join predicate for join query 212, in the absence of an explicit join predicate that specifies one or more comparisons that are used to combine records in the input datasets.

To ensure that joined dataset 214 adheres to compliance policies 236 and privacy policies 238 for the corresponding input datasets, conflation apparatus 208 makes modifications 210 to join query 212 so that rules in compliance policies 236 and privacy policies 238 are applied during the creation of joined dataset 214. For example, conflation apparatus 208 parses join query 212 into a relational operator tree that includes nodes representing projection and selection operators to be applied to each of the input datasets. The projection operators are used to select columns or fields of the input datasets to which join query 212 applies, and the selection operators are used to select rows or records of the input datasets to be returned by join query 212. Conflation apparatus 208 also matches records and/or fields selected by join query 212 to one or more rules in compliance policies 236 and/or privacy policies 238 and adds additional operators representing the rule(s) to the relational operator tree. Each additional operator may be used to filter, obfuscate, or otherwise apply a corresponding rule to records and/or fields in a corresponding input dataset.

In turn, conflation apparatus 208 executes the modified join query 212 to create joined dataset 214. Continuing with the above example, conflation apparatus 208 converts the modified relational operator tree into a version of join query 212 for execution by an environment that produces joined dataset 214 from the input datasets. This environment includes, but is not limited to, an offline-processing environment that uses one or more batch operations to produce joined dataset 214 from the input datasets. The offline-processing environment then executes the compiled join query 212 to generate joined dataset 214 from the input datasets.

After joined dataset 214 is created, conflation apparatus 208 applies one or more transformation queries 246 specified in data-processing logic 240 to joined dataset 214 to produce derived dataset 216. For example, transformation queries 246 are used to perform additional filtering, joining, aggregating, and/or other processing of rows and/or columns of joined dataset 214. In turn, derived dataset 216 is outputted as the result of transformation queries 246.

After joined dataset 214 and derived dataset 216 are created, conflation apparatus 208 and/or another component of platform 202 store one or both datasets in a key-value store 218, search index 220, and/or other data stores 234 provided by platform 202. For example, the component stores derived dataset 216 in data stores 234 for subsequent querying or use, as described in further detail below. The component optionally stores joined dataset 214 in one or more data stores 234 if joined dataset 214 contains information that is useful to the data providers and/or to allow additional derived datasets (not shown) to be created from joined dataset 214.

In one or more embodiments, the component stores joined dataset 214 and/or derived dataset 216 in data stores 234 according to the corresponding schemas 242. For example, the component identifies one or more keys in a schema for joined dataset 214 and/or derived dataset 216 and stores mappings of the key(s) to corresponding values in key-value store 218. In another example, the component identifies one or more searchable fields in a schema for joined dataset 214 and/or derived dataset 216 and stores values of the searchable fields in search index 220. Creating and storing joined datasets and/or derived datasets using modified join queries is described in further detail below with respect to FIGS. 3A-3B.

Online service 222 then processes requests 232 for data 230 from joined dataset 214 and/or derived dataset 216 using data stores 234. For example, online service 222 receives a request that includes one or more keywords to be matched to records in joined dataset 214 and/or derived dataset 216. To process the request, online service 222 converts the request into a query of search index 220 that includes the keyword(s) as search parameters and executes the query against search index 220. Online service 222 receives, as a result of the query, a set of records in joined dataset 214 and/or derived dataset 216 that are mapped to the keyword(s) in search index 220 and returns the records in response to the request. In another example, online service 222 receives a request for records that match a range of employee IDs in joined dataset 214 and/or derived dataset 216. Online service 222 converts the request into a query that specifies the range of employee IDs as key values in key-value store 218. Online service 222 executes the query against key-value store 218 to retrieve a set of records mapped to the employee IDs from key-value store 218 and returns the records in response to the request.

In one or more embodiments, online service 222 receives, processes, and/or responds to requests 232 according to an application-programming interface (API) with entities (e.g., entity 1 250, entity z 252) that submit requests 232. For example, the API exposes calls that can be made by the entities to search, retrieve, and/or otherwise generate requests 232 for data in joined dataset 214, derived dataset 216, and/or other datasets in data stores 234. A specification for the API is optionally stored in metadata store 224 to facilitate debugging and/or auditing of online service 222. When a request is received from an entity, online service 222 converts parameters of the request into a query. Online service 222 then executes the query against one or more data stores 234 containing the data. After the data store(s) return data 230 in response to the query, online service 222 formats data 230 into a response to the request (e.g., according to the specification for the API) and transmits the response to the entity. As a result, the API implemented by online service 222 allows the entities to access joined dataset 214 and/or derived dataset 216 without knowing where or how the dataset(s) are stored.

Online service 222 additionally includes functionality to process requests 232 according to compliance policies 236, privacy policies 238, and/or access control policies 242 related to joined dataset 214 and/or derived dataset 216 in metadata store 224. In some embodiments, access control policies 242 are created based on input from administrators and/or other representatives of the input datasets' data providers. For example, platform 202 includes administrator accounts for administrators of the data providers. Access control policies 242 include rules and/or roles that grant different levels of access to the joined and/or derived data by various entities (e.g., users, organizations, etc.). A given rule and/or role for accessing joined dataset 214 and/or derived dataset 216 may be added to access control policies 242 after some or all administrator accounts have approved the rule and/or role. At least some of these rules and/or roles may be dynamically added to access control policies 242 to enable "just in time" access to joined dataset 214 and/or derived dataset 216 by additional entities or users (e.g., for debugging or auditing purposes). Conversely, any of the administrators may revoke access associated with a given rule and/or role to joined dataset 214 and/or derived dataset 216 (e.g., by deleting the rule and/or role from access control policies 242). In other words, platform 202 supports "shared management" of access to joined dataset 214, derived dataset 216, and/or other data in data stores 234 by administrators of the data providers.

After a request (e.g., requests 232) for data 230 from joined dataset 214 and/or derived dataset 216 is received, online service 222 applies rules and/or roles in access control policies 244 to the entity making the request to verify that the entity is granted access to the requested data 230. For example, online service 222 matches an identifier for the entity's account with online service 222 (e.g., after the entity supplies authentication credentials for the account to online service 222) to an entry in an access control list in access control policies 242. If the entry indicates that the entity is granted access to the requested data 230, online service 222 proceeds with processing the request. In another example, online service 222 matches attributes of the request (e.g., Internet Protocol (IP) address, port, time of request, parameters of the request, etc.) to rules in access control policies 244 to verify that the request is allowed by the rules. If access control policies 244 do not allow access to joined dataset 214 and/or derived dataset 216 based on attributes of the request and/or the entity making the request, online service 222 discards or rejects the request.

In some embodiments, access control policies 244 include data access limits related to the rules and/or roles. For example, a rule and/or role in access control policies 244 includes a "quota" for the maximum amount of data 230 that can be retrieved over a given period (e.g., a day, week, month, etc.). When a request matches the rule and/or role, platform 202 determines the amount of data left in the corresponding quota. If the amount of data returned in response to the request causes the quota to be exceeded, the platform rejects, drops, or delays the request (e.g., until processing of the request no longer causes the quota to be exceeded).

After a request is determined to be allowed by access control policies 244, online service 222 converts the request into a query (e.g., queries 228) and makes modifications 226 to the query to enforce compliance policies 236, privacy policies 238, and/or access control policies 242. Such modifications 226 may be made in a similar manner as modifications 210 to join query 212. For example, online service 222 converts the query into a relational operator tree that includes nodes representing projection and selection operators to be applied to joined dataset 214 and/or derived dataset 216. Online service 222 then adds additional operators representing rules in compliance policies 236, privacy policies 238, and/or access control policies 244 to the relational operator tree. Each additional operator may be used to filter, obfuscate, or otherwise apply a corresponding rule to rows and/or columns in joined dataset 214 and/or derived dataset 216. Online service 202 may then execute the modified query to retrieve data 230 from joined dataset 214 and/or derived dataset 216 in a way that adheres to compliance policies 236, privacy policies 238, and/or access control policies 242.

Unlike operators that are added as modifications 210 to join query 212, operators added as modifications 226 to queries 228 processed by online service 222 may be specific to entities making the corresponding requests 232 and/or attributes of requests 232. For example, online service 222 matches the entity making a request and/or one or more attributes of the request to one or more rules and/or roles specified in compliance policies 236, privacy policies 238, and/or access control policies 244. Online service 222 then converts the request into one or more queries 228 of data stores 234 and makes modifications 226 that apply the rules and/or roles to queries 228. In other words, online service 222 customizes queries 228 to enforce policies that are specific to the entity and/or context of the corresponding request. In contrast, conflation apparatus 208 makes modifications 210 to join query 212 to enforce policies that are specific to data providers of the corresponding input datasets and/or entities represented by data in the input datasets.

In one or more embodiments, access control policies 242 are used to govern access to joined dataset 214 and/or derived dataset 216 by an application that implements one or more components of platform 202. For example, the application includes data-processing logic 240 for generating joined dataset 214 and/or derived dataset 216, as well as an implementation of online service 222 for processing queries of joined dataset 214 and/or derived dataset 216. If abusive or erroneous behavior is detected in the application and/or users of the application, administrators of the data providers may revoke access to joined dataset 214, derived dataset 216, and/or other components of platform 202 by the application.

In some embodiments, conflation apparatus 208, online service 222, data stores 234, and/or other components of platform 202 store and/or process queries 228 of joined dataset 214 and/or derived dataset 216 in a way that prevents data associated with different entities from being joined or mixed during processing of requests 232 and/or queries 228. These entities may include, but are not limited to, entities represented by data in joined dataset 214 and/or derived dataset 216 (e.g., users, companies, schools, and/or groups with records in joined dataset 214 and/or derived dataset 216) and/or data providers of input datasets used to produce joined dataset 214 and/or derived dataset 216. The entities may be identified in compliance policies 236, privacy policies 238, access control policies 244, and/or other configurable policies related to joined dataset 214 and/or derived dataset 216. For example, one or more policies in metadata stores 224 may specify a list of entity identifiers and/or entity types to be isolated from one another in data stores 234.

Moreover, such isolation of data may be performed on a logical and/or physical basis. First, platform 202 includes functionality to logically isolate data associated with different entities in joined dataset 214 and/or derived dataset 216. Such logical isolation may be achieved by encrypting data in data stores 234 with a separate key for each entity. In turn, a given data store processes a request for data 230 associated with a given entity by decrypting data 230 using the entity's key and returning the decrypted data. The key may be mapped to the entity's ID in metadata store 224 and provided for use in processing the request after the request is determined to be valid (e.g., based on access control policies 244 in metadata store 224). Because data associated with other entities is encrypted using other keys, such data will not be returned in a decrypted state even when the request inadvertently retrieves the data from one or more data stores 234.

Such logical isolation is also, or instead, enforced via additional modifications 210 to join query 212 and/or modifications 226 to queries 228 of joined dataset 214 and/or derived dataset 216. For example, conflation apparatus 208 may modify a given join query 212 that includes an aggregation (e.g., sum, count, average, minimum, maximum, etc.) of a field in an input dataset to include a "group by" clause that groups results of join query 212 by unique IDs of entities (e.g., companies, customers, etc.) to be logically isolated from one another. In turn, records in joined dataset 214 include aggregated values of the field that do not combine or mix data from different entities. In another example, online service 222 processes requests 232 for data 230 in data stores 234 based on identities and/or access rights associated with entities making requests 232. If a given entity is granted access to only a subset of joined dataset 214 and/or derived dataset 216, online service 222 converts requests 232 from the entity to queries 228 of data stores 234 in a way that restricts the entity's access to other parts of joined dataset 214 and/or derived dataset 216. Online service 222 also, or instead, transmits queries 228 to data stores 234 using a security identity that reflects the entity's level of access to joined dataset 214 and/or derived dataset. In turn, data stores 234 return data 230 that the entity is granted access to in response to queries 228.

Such logical isolation is also, or instead, provided using multiple instances of platform 202 and/or components in platform 202. For example, a different instance of platform 202 is created for each joined dataset (e.g., joined dataset 214) that combines data from multiple input datasets and/or any derived datasets (e.g., derived dataset 216) produced from the joined dataset. Each instance of platform 202 may also reside in a different virtual network within a cloud computing and/or distributed system. As a result, data that resides within a given instance of platform 202 is inaccessible to other instances of platform 202.

Second, platform 202 includes functionality to physically isolate data associated with different entities in joined dataset 214 and/or derived dataset 216. For example, a given instance of platform 202 may be deployed on a set of resources and/or an environment that is physically separated from other instances of platform 202 (e.g., within the infrastructure associated with a data provider of an input dataset instead of infrastructure that is shared by multiple data providers). As a result, compute and storage resources used by that instance of platform 202 are physically isolated from compute and storage resources used by other instances of platform 202, which further secures data in the instance against unauthorized and/or inadvertent access.

One or more components of platform 202 additionally include functionality to support auditing of access to joined dataset 214 and/or derived dataset 216, as well as exploration of data 230 in joined dataset 214 and/or derived dataset 216, by administrators of the data providers. For example, online service 222 and/or another component of platform 202 maintain logs of accesses to the input datasets, joined dataset 214, derived dataset 216, and/or other data managed by platform 202. Entries in the logs represent reads, writes, and/or transformations of the data. Each entry identifies an entity accessing the data, the data accessed by the entity, the time of the access, the type of access (e.g., reading from a dataset, writing to a dataset, creating a dataset from one or more other datasets, etc.), and/or a result of the access (e.g., success, failure, reason for failure, etc.). In turn, the logs are accessible to administrator accounts with platform 202 to allow administrators of the data providers to monitor use of the data by various entities and/or detect potential bugs or issues associated with access to the data by the entities.

In another example, platform 202 includes a "data explorer" application that allows administrators of each data provider to view data from the data provider that is stored within platform 202. If an administrator from a first data provider wishes to view data from a second data provider, the administrator may submit a request for access to the data. The request includes the identity of the administrator, the data to be accessed, a reason for the access, and/or a duration of the access. If the request is approved by another administrator of the second data provider, one or more components of platform 202 may update access control policies 244 to reflect the approval, and the administrator from the first data provider is able to issue queries 228 to access the data.

Those skilled in the art will appreciate that the system of FIG. 2 may be implemented in a variety of ways. First, conflation apparatus 208, online service 222, metadata store 224, and/or data stores 234 may be provided by a single physical machine, multiple computer systems, one or more virtual machines, a grid, one or more databases, one or more filesystems, and/or a cloud computing system. Conflation apparatus 208 and online service 222 may additionally be implemented together and/or separately by one or more hardware and/or software components and/or layers. For example, conflation apparatus 208 may be provided by a cluster that generates joined dataset 214 and/or derived dataset 216 in an offline or batch-processing basis. On the other hand, online service 222 includes one or more service endpoints that process requests 232 of data in joined dataset 214 and/or derived dataset 216 in a real-time or near-real-time basis.

Second, the functionality of the system may be used with various types of data and/or data stores. For example, one or more instances of platform 202 may be used to conflate, store, and/or manage access to streaming data, images, audio, video, telemetry data, and/or other types of data. In another example, data stores 234 may include a graph database, relational database, insights platform, distributed streaming platform, and/or another type of system for storing and/or delivering data.

Figure 3A:
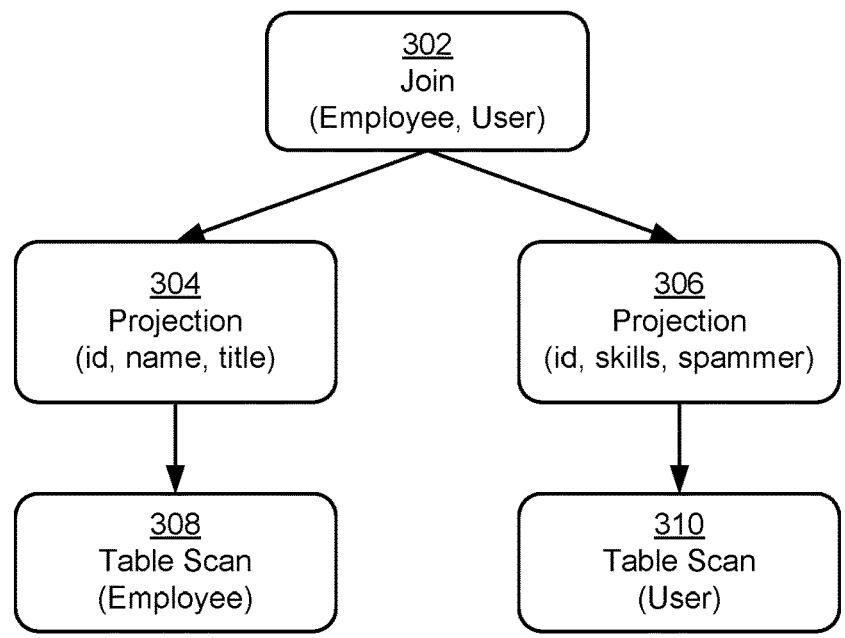
FIG. 3A shows an example relational operator tree for a join query in accordance with the disclosed embodiments.

FIG. 3A shows an example relational operator tree for a join query (e.g., join query 212 of FIG. 2) in accordance with the disclosed embodiments. The relational operator tree includes a number of nodes 302-310 representing relational operators in the join query. Each node in the tree operates on its child nodes, and the root node 302 of the tree represents the result of the join query.

In particular, the relational operator tree includes nodes 308-310 representing table scans of an "Employee" dataset and a "User" dataset, respectively. Node 304 is a parent of node 308 and specifies projection of fields named "id," "name" and "title" from the "Employee" dataset. Node 306 is a parent of node 306 and specifies projection of fields named "id," "skills," and "spammer" from the "User" dataset.

The root node 302 is a parent of nodes 304 and 306 and represents a join of an "Employee" dataset and a "User"

dataset. As mentioned above, the join may include a join predicate represented by matches between records of the "Employee" dataset and records of the "User" dataset. The matches are generated based on bindings between user accounts represented by records in the "Employee" dataset and records and employee accounts represented by records in the "User" dataset. The matches are also, or instead, generated based on comparisons of fields in the records, such as first names, last names, email addresses, locations, titles, positions, companies, and/or other attributes of users and employees.

In one or more embodiments, nodes 302-310 are used to carry out the following GraphQL join query:

```
Query {
    Employee {
        id
        name
        title
        User {
            skills
        }
    }
}
```

The join query above is applied to the records in the "Employee" and "User" datasets with the following schemas:

```
Employee {
    id: String
    name: String
    title: String
}
User {
    id: String
    name: String
    title: String
    skills: Skill[ ]
    spammer: Boolean @Internal
}
Skill {
    name: String
    expertiseScore: float
}
```

Consequently, the join query is used to combine the "id," "name," and "title" fields in records of the "Employee" dataset with the "skills" field in corresponding records of the "User" dataset. For example, the join query is used to join records in the two datasets based on exact matches between the "name" and "title" fields in the records (i.e., when a record in the "Employee" dataset has the same "name" and "title" values as a record in the "User" dataset, the two records are joined). On the other hand, the "id" fields in the two datasets represent two distinct primary keys that are assigned to records in completely different ways. Because there is no known mapping between the "id" fields in the "User" and "Employee" datasets, joins of records in the two datasets may be performed without comparing or matching the "id" fields The "spammer" field in the "User" dataset is an internal field that is not exposed to end users accessing the joined dataset. Instead, the "spammer" field is used by a platform (e.g., platform 202 of FIG. 2) to process the join query in a way that enforces compliance policies for the "User" and/or "Employee" datasets, as discussed in further detail below with respect to FIG. 3B.

Figure 3B:
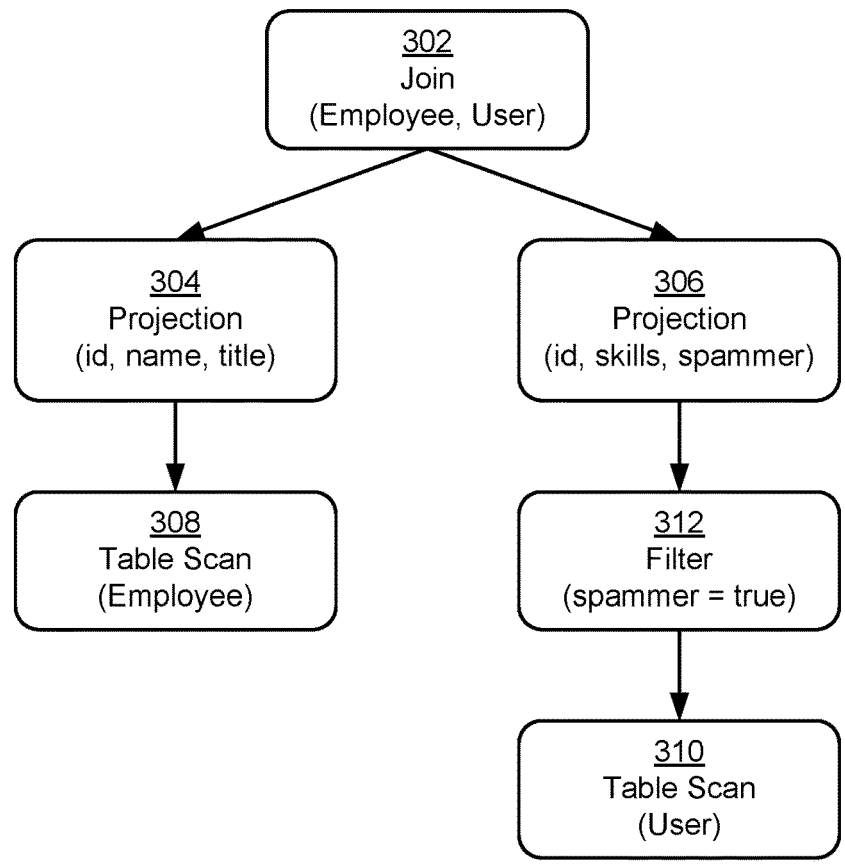
FIG. 3B shows an example relational operator tree for a join query in accordance with the disclosed embodiments.

FIG. 3B shows an example relational operator tree for a join query in accordance with the disclosed embodiments. More specifically, FIG. 3B shows the relational operator tree of FIG. 3A after a node 312 is inserted between nodes 306 and 310.

Node 312 represents an operator that is used to enforce one or more compliance rules for the "User" dataset and/or for joining the "User" dataset with another dataset. As shown in FIG. 3B, node 312 specifies filtering of records in the "User" dataset that have a value of "true" for the "spammer" field. Thus, node 312 may represent a compliance rule that is used to prevent users identified as spammers from being included in the joined dataset.

After the relational operator tree is modified to include node 312 and/or other nodes that apply compliance rules to one or both input datasets, the relational operator tree may be compiled into an offline or batch-processing job that carries out the join of the input datasets. The output of the job includes a joined dataset with rows representing users that are found in both the "Employee" and "User" datasets. Each row in the joined dataset includes the "id," "name," and "title" fields from the "Employee" dataset and the "skills" field from the "User" dataset.

The joined dataset may further be processed to generate a derived dataset with the following schema:

```
SkilledEmployee {
    id: String @Unique
    name: String @Searchable
    title: String
    skills: String[ ] @Searchable
}
```

For example, the derived dataset may be produced by applying one or more thresholds to the "expertiseScore" component of entries in the "skills" field of the joined dataset. In turn, the "skills" field in each record of the "SkilledEmployees" derived dataset stores a list of strings representing skills for which the corresponding user has an "expertiseScore" that is greater than the threshold.

The schema of the derived dataset may additionally be used to store the derived dataset and/or process queries of the derived dataset. For example, the "Unique" keyword next to the "id" field indicates that records in the derived dataset can be uniquely identified by values of the field. As a result, records in the derived dataset may be stored in a key-value store (e.g., key-value store 218 of FIG. 2), and values of the "id" field may be used as keys for retrieving the records from the key-value store. In another example, the "Searchable" keyword next to the "name" and "skills" fields indicates that records in the derived dataset can be searched by values of those fields. In turn, records in the derived dataset may be stored in a search index (e.g., search index 220 of FIG. 2) in a way that allows the records to be searched and/or retrieved by values of the "name" and "skills" fields.

Figure 4:
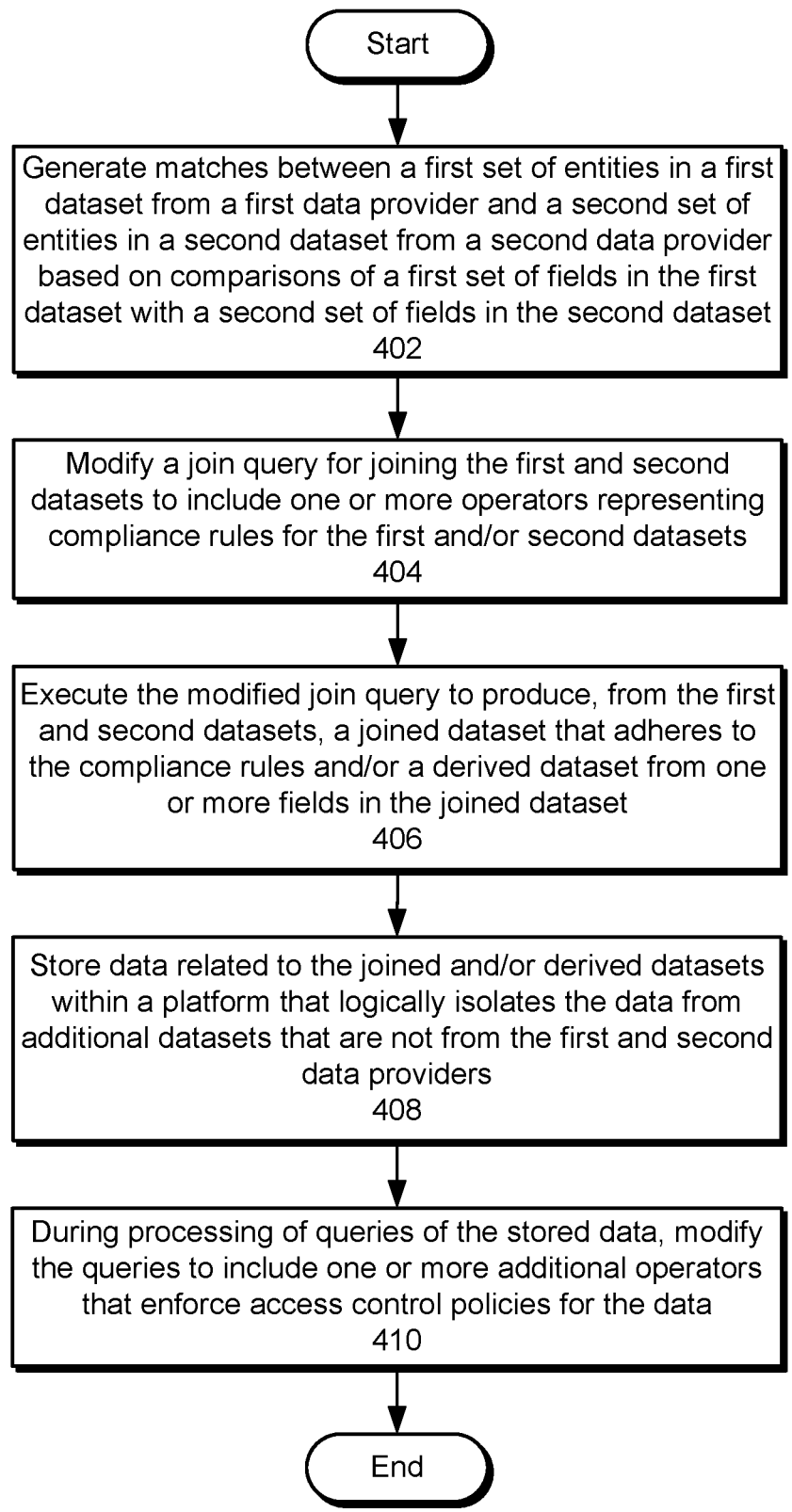
FIG. 4 shows a flowchart illustrating a process of managing conflation and access to data in accordance with the disclosed embodiments.

FIG. 4 shows a flowchart illustrating a process of managing conflation and access to data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, matches between a first set of entities in a first dataset from a first data provider and a second set of entities in a second dataset from a second data provider are generated based on comparisons of a first set of fields in the first dataset with a second set of fields in the second dataset (operation 402). For example, the entities may include users, employees, companies, schools, skills, and/or jobs. Each entity may be identified by a different unique ID in each of the datasets, which precludes matching of the entities across the datasets by the entities' IDs in the datasets. Instead, a table and/or column of bindings between different types of accounts represented by the IDs in the datasets may be used to establish "very high confidence" matches between the two sets of entities. Exact matches between email addresses in the two datasets may also, or instead, be used to generate "high confidence" matches between the two sets of entities. Exact matches between first names, last names, titles, positions, locations, seniorities, companies, and/or other attributes in the first and second sets of fields may also, or instead, be used to generate "middle confidence" matches between the two sets of entities. The matches and corresponding levels of confidence may be stored in a table and used to join the corresponding records in the datasets during execution of the join query, as described in further detail below.

Continuing with the above example, a machine learning model may also, or instead, be applied to features that include values of the first and second sets of fields (e.g., first and last names, titles, positions, locations, companies, etc.) and/or comparisons of the first and second sets of fields (e.g., a Boolean value indicating if a field in a record from the first dataset exactly matches a corresponding field a record from the second dataset, an edit distance between the two fields, etc.). The machine learning model may include (but is not limited to) a regression model, neural network, tree-based model, and/or deep learning model. In response to the inputted features, the machine learning model outputs, for a given pair of records that include a first record from the first dataset and a second record from the second dataset, a match score representing the level of confidence that the first and second records represent the same entity. When the match score exceeds a threshold, a match between the two records is generated.

Next, a join query for joining the first and second datasets is modified to include one or more operators representing compliance rules for the first and/or second datasets (operation 404). For example, the join query may be obtained from metadata for conflating the first and second datasets. The join query may lack an explicitly specified join predicate; instead, the join query may include an implicit (e.g., unstated or unspecified) join predicate for joining the datasets based on the matches generated in operation 402. One or more fields in the first and/or second datasets are matched to the compliance rules, and the join query is parsed into a relational operator tree. Operators representing the compliance rules are then inserted into the relational operator tree, and the modified relational operator tree is compiled into an environment-specific version of the join query.

The modified join query is then executed to produce, from the first and second datasets, a joined dataset that adheres to the compliance rules and/or a derived dataset from one or more fields in the joined dataset (operation 406). Continuing with the above example, the compiled join query is executed in the corresponding environment (e.g., an offline- or batch-processing system) to produce the joined dataset, and additional transformation queries may then be applied to the joined dataset to produce the derived dataset.

During creation of the joined dataset, a first record in the first dataset may be joined with a second record in the second dataset if the confidence in a match between entities represented by the two records exceeds a threshold. This threshold may be selected and/or adjusted based on the sensitivity or importance of the data in the first, second, and/or joined datasets (e.g., joining of financial data requires high confidence in the matches, while joining of two publicly available datasets requires lower confidence).

During execution of the modified join query, the inserted operators are used to filter fields and/or records from the joined dataset so that the joined dataset does not violate the compliance rules. For example, the modified join query may include an inserted operator, which enforces a privacy setting represented by a field named "emailVisible" that, when set to false, hides a user's email address. The operator may be added to a "select" statement in the join query and include the following representation:

(emailVisible?email:"null")

When the modified join query is executed, the operator adds the "email" field to the "select" statement if a condition represented by the "emailVisible" field evaluates to true and returns a null value if the condition evaluates to false. As a result, the operator enforces the privacy setting by omitting an email address stored in the "email" field (e.g., by returning a null value instead) from the joined dataset for users that have the privacy setting enabled. In other words, the operator selectively filters the field from the joined dataset based on the value of the privacy setting.

Data related to the joined and/or derived datasets is stored within a platform that logically isolates the data from additional datasets that are not from the first and second data providers (operation 408). Finally, during processing of queries of the stored data, the platform modifies the queries to include one or more additional operators that enforce access control policies for the data (operation 410).

More specifically, data in the joined and/or derived datasets may be stored in one or more data stores within the platform according to schemas for the joined and/or derived datasets. For example, the schema(s) may specify a searchable field and/or a unique field in the joined and/or derived datasets. The platform stores mappings of a first set of values of the searchable field to records containing the values in a search index and mappings of a second set of values of the unique field to records containing the values in a key-value store. The platform then processes queries containing values of the unique field by retrieving the corresponding records from the key-value store. The platform also, or instead, processes queries representing searches of the data by matching the corresponding search parameters to entries in the search index and retrieving records mapped to the entries from the search index.

To isolate the joined and/or derived datasets from additional datasets from other data providers (e.g., to ensure the integrity and/or security of each dataset), the platform may encrypt data in the joined and/or derived datasets with a first key for the first and/or second data provider and encrypt the additional datasets with one or more keys for the other data providers. During processing the queries of data from the joined and/or derived datasets, the platform may decrypt the data using only the first key. Thus, even if data that belongs to other data providers is inadvertently retrieved by the queries, encryption of the data with a different key prevents the underlying values of the data from being returned in results of the queries.

The platform may also, or instead, modify execution of the queries to exclude the additional datasets from results of the queries. For example, the platform may include, in each dataset, a unique ID for the data provider(s) associated with the dataset. Thus, the joined and/or derived datasets may include an ID for the first and second data providers, and each additional dataset may include an ID for the corresponding data provider(s). During processing of queries of the joined and/or derived dataset, the platform adds clauses that group the corresponding results by the ID for the first and second data providers and/or return only results that include the ID for the first and second data providers to prevent aggregation of the joined and/or derived datasets with the additional datasets.

The joined and/or derived datasets may also, or instead, be isolated from additional datasets from other data providers by storing the joined and/or derived datasets in one instance of the platform and the additional datasets in one or more other instances of the platform. Each instance of the platform is thus unable to access data stored in other instances of the platform. Additional physical isolation of the datasets may be provided by deploying the joined and/or derived datasets on a set of resources and/or an environment that is physically separated from the other datasets.

To enforce the access control policies, the platform verifies that an entity requesting data from the joined and/or derived datasets is granted access to the data before processing one or more queries on the entity's behalf. For example, the platform matches the entity's identity and/or attributes of the entity's request to one or more rules and/or roles in the access control policy. If the rules and/or roles indicate that the entity's request is valid, the platform continues processing the request. If the roles and/or roles indicate that the entity's request is not valid, the platform drops or rejects the request.

The platform also, or instead, processes queries of the data based on data access limits for the corresponding entities. For example, the platform receives a request for data in the joined and/or derived datasets from an entity. The platform matches the entity's identity to a data access limit for the entity over a given period (e.g., within the last day, week, month, etc.) specified in the access control policy and/or the amount of data accessed by the entity over the same period. If the amount of data returned in response to the request causes the entity's data access limit to be exceeded, the platform rejects, drops, or delays the request (e.g., until processing of the request no longer causes the data access limit to be exceeded).

The platform also, or instead, converts a query of the stored data into a relational operator tree that includes nodes representing projection and selection operators to be applied to the data. The platform adds operators representing the access control policies to the relational operator tree. Each additional operator may be used to filter, obfuscate, or otherwise apply a corresponding rule or role in an access control policy to rows and/or columns in the joined and/or derived datasets. The rule/role may be specific to the entity for which the query is performed (e.g., the entity requesting data retrieved by the query). The platform may then execute the modified query to retrieve data from the joined and/or derived datasets in a way that adheres to the access control policy.

Figure 5:
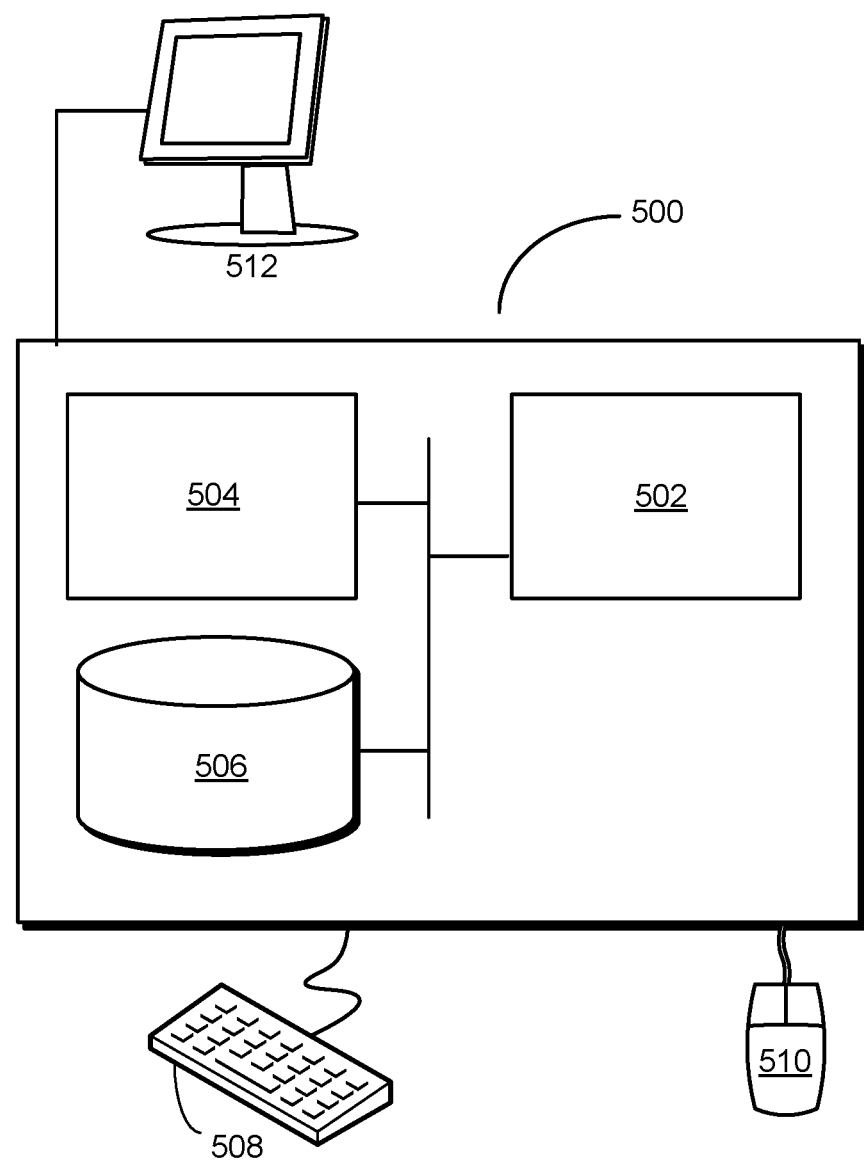
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for managing data conflation. The system includes a conflation apparatus, one or more data stores, and/or an online service within a platform. The conflation apparatus generates matches between a first set of entities in a first dataset from a first data provider and a second set of entities in a second dataset from a second data provider based on comparisons of a first set of fields in the first dataset with a second set of fields in the second dataset. The conflation apparatus also modifies a join query for joining the first and second datasets by the generated matches to include one or more operators representing compliance rules for the first or second datasets. The conflation apparatus then executes the modified join query to produce, from the first and second datasets, a joined dataset that adheres to the compliance rules. The data store(s) store data related to the joined dataset in a way that prevents joining of the data with additional datasets that are not from the first and second data providers. During processing of queries of the data, the online service enforces an access control policy for the joined dataset, which is generated based on input from administrators of the first and second data providers.

In addition, one or more components of computer system 500 may be remotely located and connected to the other components over a network. Portions of the present embodiments (e.g., platform, online network, conflation apparatus, metadata store, data stores, online service, etc.) may also be located on different nodes of a distributed system that implements the embodiments. For example, the present embodiments may be implemented using a cloud computing system that manages conflation of and access to datasets from a number of remote data providers.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
generating matches between a first set of entities in a first dataset from a first data provider and a second set of entities in a second dataset from a second data provider based on comparisons of a first set of fields in the first dataset with a second set of fields in the second dataset;
modifying a join query for joining the first and second datasets to include one or more operators representing one or more compliance rules for the first or second datasets, wherein the join query comprises a join predicate represented by the generated matches;
executing the modified join query to produce, from the first and second datasets, a joined dataset that adheres to the one or more compliance rules;
storing at least one of the joined data set or data related to the joined dataset within one or more data stores within a platform that isolates the joined dataset from one or more additional datasets that are not from the first and second data providers;
wherein the one or more data stores is based on a schema;
identifying, based on the schema, at least one of a searchable field or a unique field of the at least one of the joined data set or the data related to the joined dataset;
in response to identifying the searchable field, storing a first set of values of the searchable field in a first type of data store;
in response to identifying the unique field, storing a second set of values of the unique field in a second type of data store different from the first type of data store; and
modifying one or more queries of the stored data to include one or more additional operators that enforce one or more access control policies for the data.

2. The method of claim 1, wherein:
storing the data related to the joined dataset comprises storing, in the platform, a derived dataset that is produced from one or more fields in the joined dataset; and
modifying the queries to include the one or more additional operators that enforce the access control policy for the joined dataset comprises adding, to a query of the derived dataset, an operator that enforces an access control policy for an entity for which the query is performed.

3. The method of claim 2, wherein storing the derived dataset in the platform comprises storing the derived dataset in one or more data stores within the platform based on a schema for the derived dataset.

4. The method of claim 3, wherein storing the derived dataset in the one or more data stores based on the schema for the derived dataset comprises:
identifying, based on the schema, a searchable field in the derived dataset and a unique field in the derived dataset;
storing a first set of values of the searchable field from the derived dataset in a search index; and
storing a second set of values of the unique field in the derived dataset in a key-value store.

5. The method of claim 1, wherein generating the matches between the first set of entities and the second set of entities comprises:
applying a machine learning model to the fields shared by the first and second sets of entities to produce match scores between pairs of entities selected from the first and second sets of entities; and
generating matches between the first and second sets of entities based on the match scores.

6. The method of claim 1, wherein modifying the join query to include the one or more operators representing the compliance rules comprises:
matching a field in the join query to a compliance rule representing a privacy setting for the field; and
inserting, into a relational operator tree representing the join query, an operator comprising a filter that is selectively applied to the field based on a value of the privacy setting.

7. The method of claim 1, wherein modifying the queries to include the one or more additional operators that enforce the one or more access control policies for the data comprises:
processing a query of the data by an entity based on an amount of the data accessed by the query and a data access limit for the entity.

8. The method of claim 1, wherein modifying the queries to include the one or more additional operators that enforce the one or more access control policies for the data comprises:
prior to executing a query of the data by an entity, verifying that the access control policy grants the entity access to the data.

9. The method of claim 1, wherein the platform logically isolates the joined dataset from the one or more additional datasets that are not from the first and second data providers by:
modifying execution of the queries to exclude the additional datasets from results of the queries.

10. The method of claim 1, wherein the platform logically isolates the joined dataset from the one or more additional datasets that are not from the first and second data providers by:
encrypting the data with a first key for the first or second data provider;
encrypting the one or more additional datasets with one or more keys for additional data providers that do not include the second data provider; and
during processing the queries of the data, decrypting the data using the first key.

11. The method of claim 1, wherein the first and second sets of entities comprise at least one of:
a user;
an employee;
a company;
a school;
a job; or
a skill.

12. The method of claim 1, wherein the first and second sets of fields comprise at least one of:
a name;
a location;
a title;
a position;
a seniority; or
a company.

13. The method of claim 1, wherein the platform isolates the joined dataset from the one or more additional datasets at least one of logically or physically.

14. A system, comprising:
one or more processors; and
memory storing instructions that, when executed by the one or more processors, cause the system to:
generate matches between a first set of entities in a first dataset from a first data provider and a second set of entities in a second dataset from a second data provider based on comparisons of a first set of fields in the first dataset with a second set of fields in the second dataset;
modify a join query for joining the first and second datasets to include one or more operators representing one or more compliance rules for the first or second datasets, wherein the join query comprises a join predicate represented by the generated matches;
execute the modified join query to produce, from the first and second datasets, a joined dataset that adheres to the one or more compliance rules;
store at least one of the joined data set or data related to the joined dataset within one or more data stores within a platform that isolates the joined dataset from one or more additional datasets that are not from the first and second data providers;
wherein the one or more data stores is based on a schema;
identify, based on the schema, at least one of a searchable field or a unique field of the at least one of the joined data set or the data related to the joined dataset;
in response to identifying the searchable field, store a first set of values of the searchable field in a first type of data store;
in response to identifying the unique field, store a second set of values of the unique field in a second type of data store different from the first type of data store; and
modify one or more queries of the stored data to include one or more additional operators that enforce one or more access control policies for the data.

15. The system of claim 14, wherein:
storing the data related to the joined dataset comprises storing, in one or more data stores within the platform, a derived dataset that is produced from one or more fields in the joined dataset; and
modifying the queries to include the one or more additional operators that enforce the access control policy for the joined dataset comprises adding, to a query of the derived dataset, an operator that enforces an access control policy for an entity for which the query is performed.

16. The system of claim 15, wherein storing the derived dataset in the one or more data stores within the platform comprises:
identifying, in a schema for the derived dataset, a searchable field in the derived dataset and a unique field in the derived dataset;
storing a first set of values of the searchable field from the derived dataset in a search index; and
storing a second set of values of the unique field in the derived dataset in a key-value store.

17. The system of claim 14, wherein generating the matches between the first set of entities and the second set of entities comprises:
assigning a confidence score to a match between a first entity in the first dataset and a second entity in the second dataset based on exact matches between the first set of fields for the first entity and the second set of fields for the second entity; and
identifying the match as valid when the confidence score exceeds a threshold.

18. The system of claim 14, wherein modifying the join query to include the one or more operators representing the compliance rules comprises:
matching a field in the join query to a compliance rule; and
inserting, into a relational operator tree representing the join query, an operator comprising a filter related to the field.

19. The system of claim 14, wherein modifying the queries to include the one or more additional operators that enforce the one or more access control policies for the joined dataset comprises:
processing a query of the data by an entity based on an amount of the data accessed by the first query and a data access limit for the entity; and
prior to executing the query, verifying that the access control policy grants the entity access to the data.

20. The system of claim 14, wherein the platform logically isolates the data from the one or more additional datasets that are not from the first and second data providers by:
encrypting the data with a first key for the second data provider;
encrypting the additional datasets with one or more keys for additional data providers that do not include the second data provider; and
during processing the queries of the data, decrypting the data using the first key.

21. At least one non-transitory computer readable medium comprising instructions that, when executed by at least one processor, cause the at least one processor to perform operations comprising:
generating matches between a first set of entities in a first dataset from a first data provider and a second set of entities in a second dataset from a second data provider based on comparisons of a first set of fields in the first dataset with a second set of fields in the second dataset;
modifying a join query for joining the first and second datasets to include one or more operators representing compliance rules for the first or second datasets, wherein the join query comprises a join predicate represented by the generated matches;
executing the modified join query to produce, from the first and second datasets, a joined dataset that adheres to the compliance rules;
storing at least one of the joined data set or data related to the joined dataset within one or more data stores within a platform that isolates the joined dataset from one or more additional datasets that are not from the first and second data providers;
wherein the one or more data stores is based on a schema;
identifying, based on the schema, at least one of a searchable field or a unique field of the at least one of the joined data set or the data related to the joined dataset;
in response to identifying the searchable field, storing a first set of values of the searchable field in a first type of data store;
in response to identifying the unique field, storing a second set of values of the unique field in a second type of data store different from the first type of data store; and modifying one or more queries of the stored data to include one or more additional operators that enforce one or more access control policies for the data.

* * * * *